United States Patent [19]

Busby

[11] Patent Number: 4,682,318

[45] Date of Patent: Jul. 21, 1987

[54] METHOD AND APPARATUS FOR UPDATING OPTICAL MEMORY DISC

[75] Inventor: Bruce E. Busby, Sunnyvale, Calif.

[73] Assignee: Sony Corporation, Tokyo, Japan

[21] Appl. No.: 788,013

[22] Filed: Oct. 16, 1985

[51] Int. Cl.$^4$ ............................ G11B 5/76; G11B 5/09
[52] U.S. Cl. ......................................... 369/59; 360/39
[58] Field of Search ...................... 369/59, 47, 48, 49; 360/39, 54

[56] References Cited

U.S. PATENT DOCUMENTS 4,562,577 12/1985 Glover et al. ......................... 369/59

*Primary Examiner*—Vincent P. Canney
*Attorney, Agent, or Firm*—Philip M. Shaw, Jr.

[57] ABSTRACT

A method of updating an optical memory disc, the disc being of the type that has a plurality of zones, one of the zones containing at least one directory block that includes a plurality of entries in the form of addresses which point at data. The method comprising the steps of reading the entries of the one directory block into a temporary location; altering the entries of the one directory block with new directory information; dividing the entries of the one directory block into two new directory blocks, each of the new directory blocks being designated by a separate pointer; writing the two new directory blocks from the temporary location onto the optical memory disc; and storing the pointers in a new directory pointer block of the optical memory disc, whereby subsequent addition of new directory information requires the alteration of less than all of the directory blocks.

13 Claims, 5 Drawing Figures

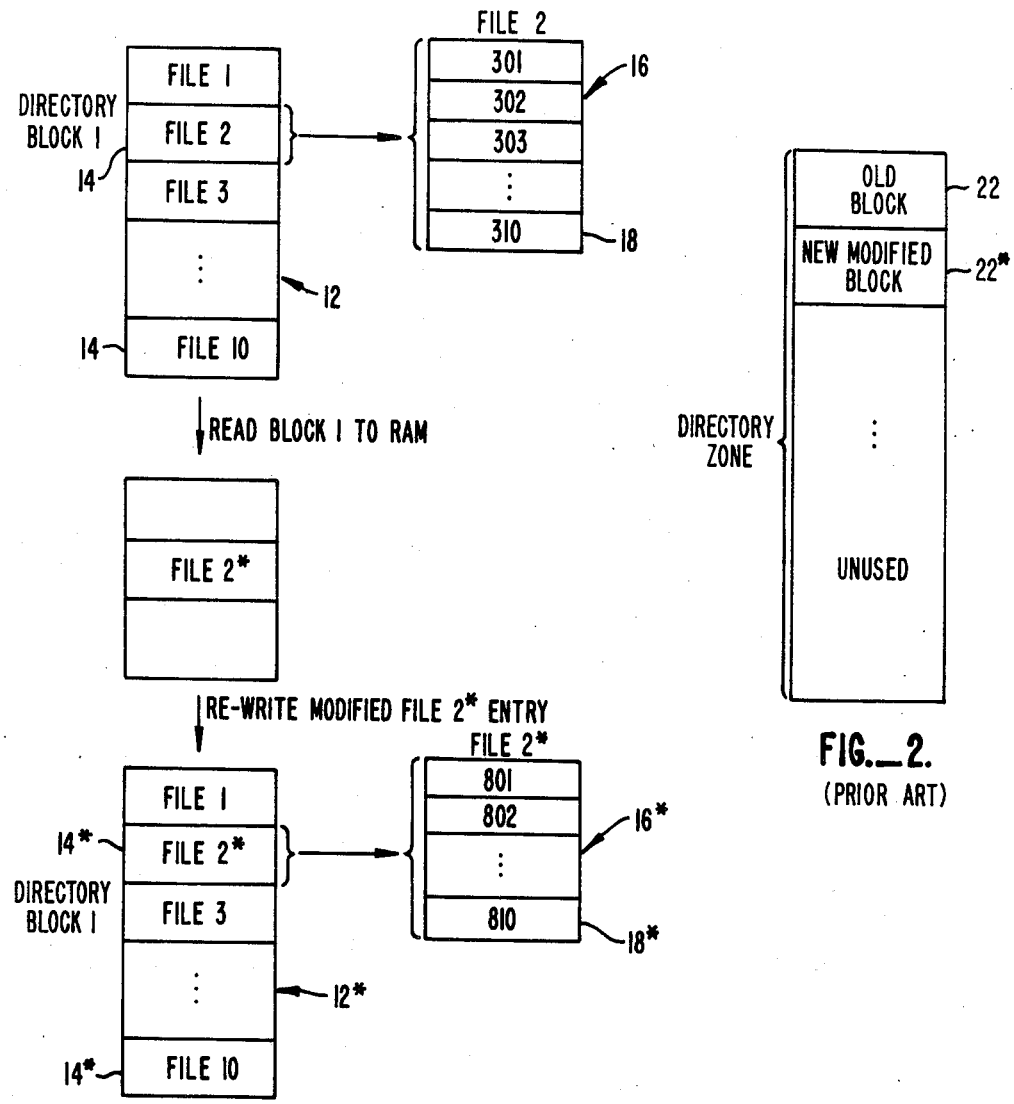
FIG._1.
(PRIOR ART)
FIG._2.
(PRIOR ART)

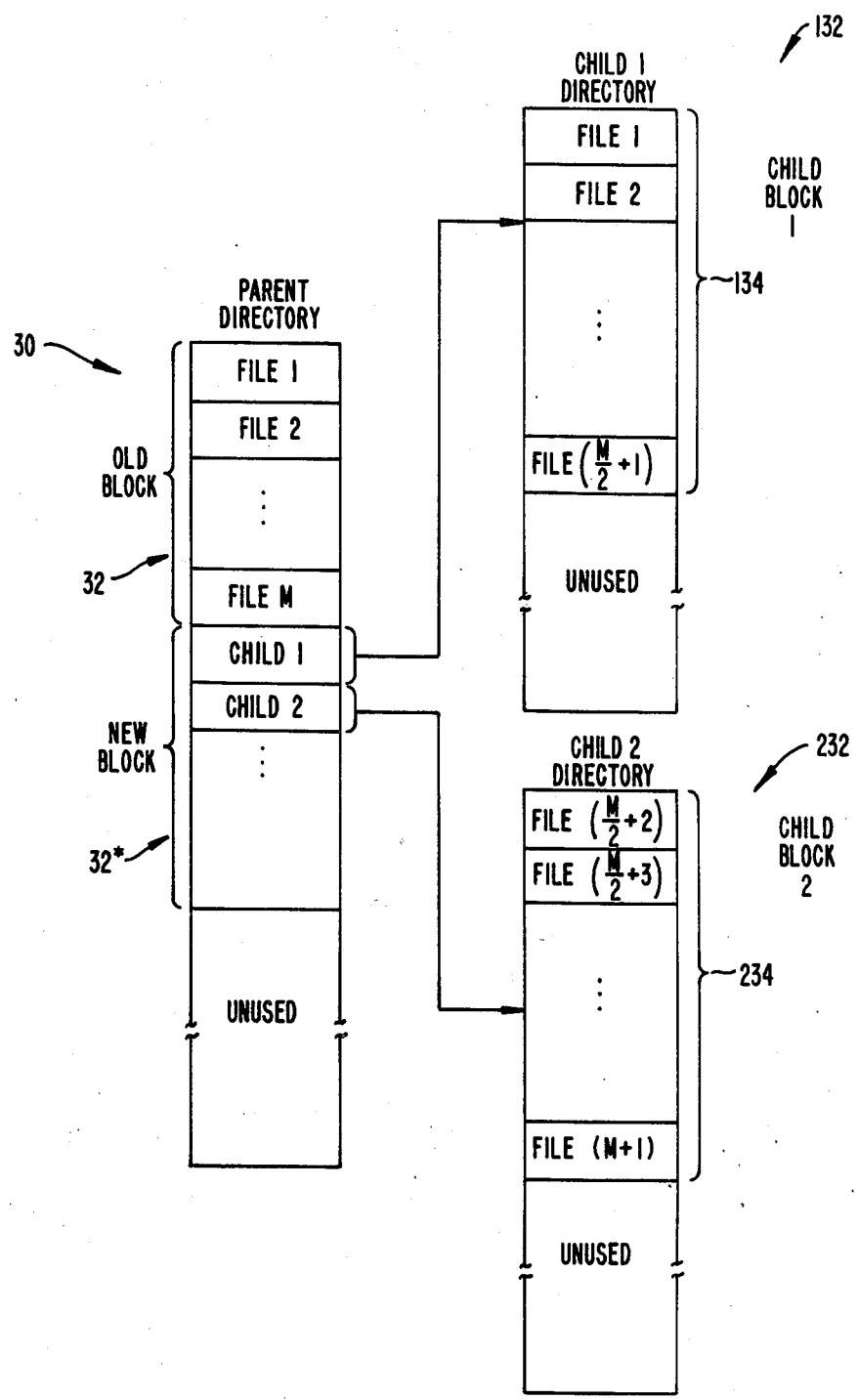
FIG._3.

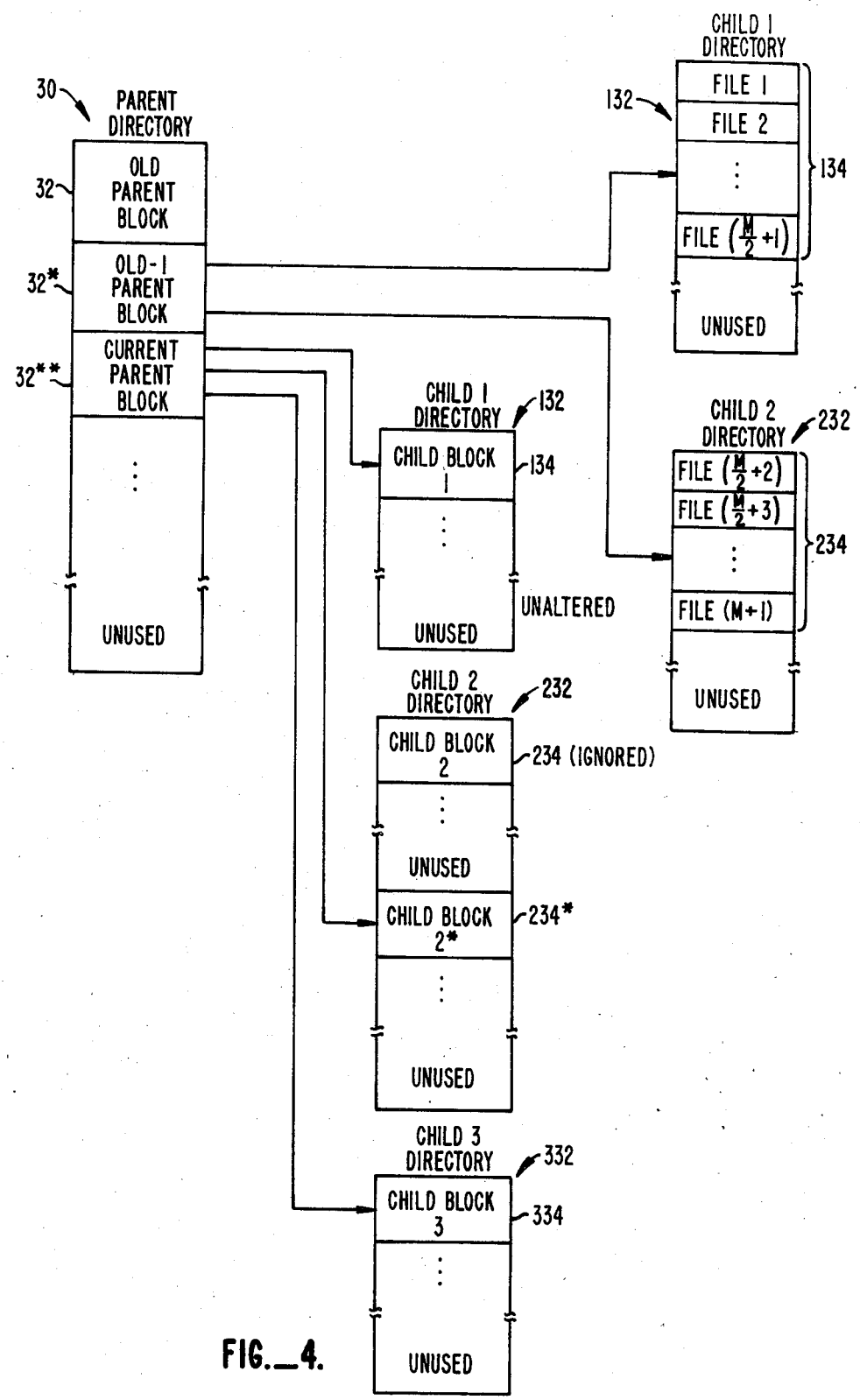
FIG._4.

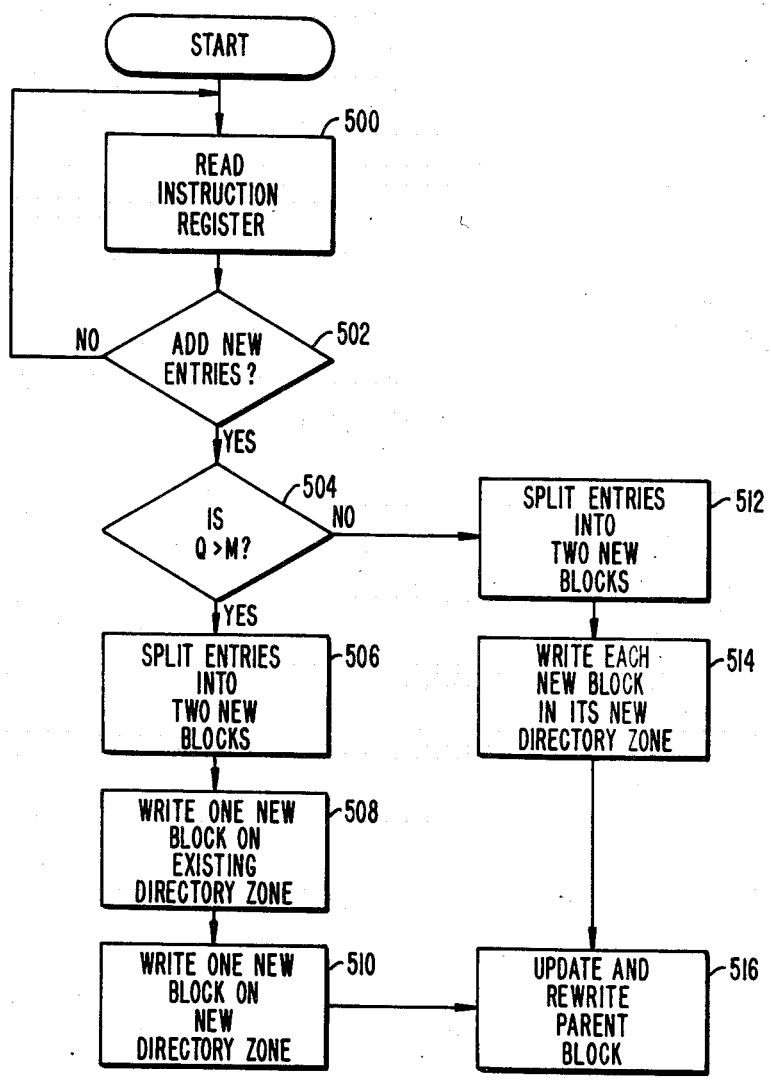
FIG._5.

METHOD AND APPARATUS FOR UPDATING OPTICAL MEMORY DISC

TECHNICAL FIELD

This invention relates to memory storage systems, and more particularly, to optical memory discs.

BACKGROUND ART

A recent advance in memory storage technology is the introduction of optical memory storage discs. In such an optical disc, a plastic substrate is provided. A thin metallic film is then positioned atop the plastic substrate by vapor deposition. This thin metallic film, generally consisting of two binary alloys such as lead selenium ($Sb_2Se_3$) and bismuth tellurium ($Bi_2Te_3$), is referred to as the writing layer. To write digital information onto this writing layer, a semiconductor laser beam is used. The laser beam changes the two binary alloys into a single four-element alloy. The laser beam's impact point on the writing layer, a dot, has a dimension that is generally less than one micron in diameter. The dot, therefore, has a reflectivity that is different from its surrounding. In reading this optical disc, another semiconductor laser beam is provided. When the reading laser scans this disc, it is capable of detecting the presence of the dot area since it has a different reflectivity than that of its surrounding.

The permanent alteration of the writing layer generally confines the use of the disc as a read only memory device. Thus, contributing to the name WRITE-ONCE/READ-MOSTLY (WORM) disc. In such a WORM disc, a difficulty is encountered when one wishes to correct even a single piece of information contained in the disc. To do so, a substantial portion, if not all, of the information must be rewritten. To minimize the necessity of rewriting the entire information contained in a disc, the present invention is utilized.

DISCLOSURE OF THE INVENTION

It is a major object of the present invention to provide a method of updating optical memory disc that minimizes the necessity to rewrite the entire memory content.

In order to accomplish the above and still further objects, the present invention provides a method of updating an optical memory disc, the disc being of the type that has a plurality of zones, one of the zones containing at least one directory block that includes a plurality of entries in the form of addresses which point at data. The method comprises the steps of reading the entries of the one directory block into a temporary location; altering the entries of the one directory block with new directory information; dividing the entries of the one directory block into two new directory blocks, each of the new directory blocks being designated by a separate pointer; writing the two new directory blocks from the temporary location onto the optical memory disc; and storing the pointers in a new directory pointer block of the optical memory disc, whereby subsequent addition of new directory information requires the alteration of less than all of the directory blocks.

Other objects, features, and advantages of the present invention will appear from the following detailed description of the best mode of a preferred embodiment, taken together with the accompanying drawings.

BRIEF DESCRIPTION OF THE DRAWINGS

FIG. 1 is a diagrammatical view of a prior art method of updating erasable memory devices;

FIG. 2 is a diagrammatical view of a prior art method of updating optical memory discs;

FIGS. 3 and 4 are diagrammatical views of a method of updating an optical memory disc according to the present invention; and FIG. 5 is a simplified flow diagram of the operation of the method of updating optical memory disc of FIGS. 3 and 4.

BEST MODE FOR CARRYING OUT THE INVENTION

Referring to FIG. 1, there is shown a prior art method of storing information in a conventional random access memory device, i.e., a device that allows data to be erased or recorded over. As illustrated, a directory block 12 may contain an arbitrary number of directory entries 14 which point at corresponding files 16; ten such entries 14 are illustrated. Each file 16 includes a plurality of data entries 18. For example, each data entry 18 may be a binary word. In the illustration, the binary word representing the decimal number 301 is contained in first data entry 18 of File 2, the decimal number 302 in second data entry 18, etc. To update or rewrite the contents of a single directory entry 14 after the contents of its corresponding file 16 have been altered, e.g., altered File 2*, only that particular directory entry 14 needed to be rewritten. The entire directory block, e.g., Directory Block 1, is first read into a temporary storage location. The contents of directory entry 14 for File 2 are then altered. The modified directory entry 14* is then returned to its location in directory block 12, pointing at modified File 2*.

To update a WORM disc in such a manner, however, is not presently possible using known techniques because data cannot be easily erased or written over. The alteration of a single bit of information requires the rewriting of the entire program. In FIG. 2, a prior art technique for modifying a WORM disc, and especially the directory aspect, is illustrated. In such a technique, a large directory zone is allocated on the WORM disc. In that zone, only a directory block 22 is present, with the bulk of that zone unused. As alterations are made in an existing directory block such as old block 22, the entire contents of that block along with the new modifications are then rewritten as new block 22*. The reading of block 22 into a working buffer location and the alteration of its contents are not illustrated because these steps are within the knowledge of one skilled in the art. For ease in description, the data entries are also not illustrated. If a user misallocates the size of the zone or miscalculates the number of possible modifications in a foreseeable period, or both, the directory zone will fill up quickly, necessitating the reproduction of the entire disc.

To minimize the rapid filling of the directory zone and the number of modifications in a directory block, the present invention is provided. As best shown in FIG. 3, an existing file directory, referred to as a PARENT directory, is designated as 30. PARENT directory 30 includes an existing directory block, referred to as old block 32. Old block 32 in turn contains a plurality of directory entries, for example, entries File 1 through entry File "M." If the number of alterations in a block is less than "M," i.e., the total number of directory entries in that block, then the simplest method is to rewrite the entire block along with the alterations, as shown in FIG. 2. If, however, the number of alterations is greater than "M," the present invention is used.

The present invention is based on the recognition that if the number of entries "M" in any block is minimized, the chance of rewriting that block when new information is presented is also minimized. The number of entries "M" in each block is based on the equation:

$$2 \leq M << N,$$

where "M" is defined as the number of directory entries in a block and "N" is the total number of directory entries which are being handled by a given WORM disc at a given time. Since the operative factor is the number of directory entries or files that need to be altered, the number of information alterations within each file is not important.

When the number of alterations is greater than "M," instead of rewriting the old block with its alterations as a new modified block, two new directories or zones are created and the old block is modified. The first new directory, referred to as the first CHILD directory 132, contains a single block 134. Instead of containing all of the entries of old block 32, child block 134 contains only one-half of the modified entries, Files 1 through (M/2+1). Similarly, the second new directory, referred to as second CHILD directory 232, contains a single block 234. Second child block 234 in turn contains only the other half of the modified entries, Files (M/2+2) through (M+1). The parent old block 32 is updated and rewritten as new block 32* which contains pointers to child blocks 134 and 234. Instead of merely updating and rewriting the parent old block, the creation of two children blocks reduces the chance of having to modify both of them in the future. Although directory entries and pointers are interrelated and identical in function, they are been used as if they were separate concepts for ease of description. Once again, the data entries are not illustrated. In addition, the alteration of the directory entries is neither illustrated nor described since that step is within the knowledge of one skilled in the art.

As best shown in FIG. 4, when directory entries in child block 234 need to be updated, the contents of first CHILD directory 132 need not be altered. In this instance, only the entries of child block 234 are first updated and the entries are then divided into two blocks—child block 234* and child block 334 which is a block in a new third CHILD directory 332. Since the track or zone containing child block 234, i.e., second CHILD directory 232, in this instance has an adequate amount of unused portions, child block 234* is written on that track. Child block 234* and child block 334 each contains one half of the directory entries of old child block 234. Moreover, parent block 32*, containing pointers to child blocks 134 and 234, is updated and rewritten as parent block 32 with pointers for CHILD directories 132, 232 and 332. Since the contents of old child block 234 are no longer relevant, it is ignored by parent block 32 because it does not contain a pointer for child block 234. In this fashion, a minimal number of blocks needs to be rewritten whenever new entries are called for. The parent block containing the pointers must be rewritten whenever new entries are made.

In determining whether or not to write one new block that contains one half of an old block in an existing directory zone and the other new block in a new zone or to write both new blocks in two new zones, the following equation is utilized:

$$0 < Q \leq M/2,$$

where "Q" is an arbitrary quantity representing the unused space of a directory zone. If "Q" equals zero, that is, when no unused space is available on a directory zone, the entire directory hierarchy for each file modification must be written onto two new zones. If "Q" is left as greater than M/2, then there will be an unnecessary amount of unused space in each zone, causing unnecessary splitting of entries and creation of new zones. Thus, the selection of values for "M" and "Q" are important in order to maximize the use of each directory zone. This relationship, however, is inapplicable where file updating as opposed to file addition is the major activity of the user. Users of WORM discs generally wish to store archival information, causing file addition to be the most likely activity.

To dynamically select a value for "Q," e.g., the "Q" for a directory block that points at the data file, "Q" can be based on the frequency that the data file has been updated. A creation/modification rate can then be determined so as to select a proper value for "Q."

In updating a WORM disc, the procedure utilized is illustrated in FIG. 5. An important step in this procedure is a determination of whether or not the unused portion of a directory zone is sufficiently large such that it is capable of receiving one-half of the contents of a block that is being updated. For example, whether or not an updated child block 234 of FIG. 4 could be written in its own directory zone. This is accomplished by first reading an instruction register, at step 500, to determine whether or not new entries are present, which is step 502. Next, at step 504, a determination is made as to whether or not to write a new block that contains one half of the entries onto an existing zone. In those instances where the unused portion is greater than one-half of the block that is being modified, the entries of that block, now modified, are split into two new blocks, at step 506. One of the two new blocks is then written onto the existing directory zone, at step 508, and the other new block written onto a new directory zone, at step 510. Pointers for these new blocks are then written into a new parent, directory block, at step 516.

In those instances where the unused portion is smaller than one-half of the block that is being modified such that neither of the two new blocks can use the unused portion of the existing directory, the nused portion is wasted. In this procedure, the modified entries are first splitted into two new blocks, at step 512. Each of the two new blocks are then written onto its own new directory zone, at step 514. Finally, pointers for these new blocks are written into a new parent, directory block, at step 516.

Although the primary advantage of the present invention is the minimization of the necessity to rewrite the entire content of a block after every modification of the data, an extra benefit is the rapid retrieval of data. Rapid data retrieval is accomplished by skipping unnecessary files in that the search proceeds from pointer in one directory to the next. This procedure of proceeding only through the desired data is contrasted with prior art searches which are generally conducted in a linear fashion where unnecessary files must be searched in order to retrieve the desired data.

Another benefit of the present invention is the capability that only blocks which contain errors need to be rewritten when errors are present, rather than rewriting the entire content. When data are rewritten from one disc to another, error-free rewriting may not be achieved, thereby requiring the rewriting of the data. Instead of rewriting the entire content of the first disc, only those blocks containing errors need to be rewritten again.

A further benefit of the present invention is that no data are ever destroyed such that an archival trail is left for audit purposes. Although the irrelevant or unnecessary data are ignored, they are still retained in the memory. Audit trails are generally required in the banking and insurance industries.

It will be apparent to those skilled in the art that various modifications may be made within the spirit of the invention and the scope of the appended claims.

What is claimed is:

1. A method of updating a memory disc, the disc being of the type that has a plurality of zones, one of the zones containing at least one directory block that includes a plurality of entries in the form of addresses which point at data, the method comprising the steps of
   reading the entries of the one directory block into a temporary location;
   altering the entries of the one directory block with new directory information;
   dividing the entries of the one directory block into two new directory blocks, each of the new directory blocks being designated by a separate pointer;
   writing the two new directory blocks from the temporary location onto the memory disc; and
   storing the pointers into a new directory pointer block of the memory disc, whereby subsequent addition of new directory information requires the alteration of less than all of the directory blocks.

2. The method as claimed in claim 1, wherein at least one of the new directory blocks and new directory pointer block is written onto the existing one zone.

3. The method as claimed in claim 1 or 2, wherein the number of entries in each directory block is determined utilizing the following equation:

$$2 \leq M < < N,$$

where "M" is defined as the number of entries in each directory block and "N" is the total number of entries which are written on the memory disc.

4. A method of updating an optical memory disc, the disc being of the type that has a plurality of zones, one of the zones containing at least one directory block that includes a plurality of entries in the form of addresses which point at data, the method comprising the steps of
   reading the entries of the one directory block into a temporary location;
   altering the entries of the one directory block with new directory information;
   dividing the entries of the one directory block into two new directory blocks, each of the new directory blocks being designated by a separate pointer;
   writing the two new directory blocks from the temporary location onto the optical memory disc; and
   storing the pointers in a new directory pointer block of the optical memory disc, whereby subsequent addition of new directory information requires the alteration of less than all of the directory blocks.

5. The method as claimed in claim 4, wherein at least one of the two new directory blocks and new directory pointer block is written onto the existing one zone.

6. The method as claimed in claim 4 or 5, wherein the number of entries in each directory block is determined utilizing the following equation:

$$2 \leq M < < N,$$

where "M" is defined as the number of entries in each directory block and "N" is the total number of entries which are written on the optical memory disc.

7. The method as claimed in claim 4 or 5, wherein each of the zones has a defined amount of space with each directory block occupying less than one half of the defined amount, the method further comprising the steps of
   measuring the size of the remaining unoccupied portion of the defined amount of the zone to determine the feasibility of writing one of the two new directory blocks in the zone;
   writing one of the two new directory blocks from the temporary location onto the remaining portion of the zone;
   writing the other new directory block from the temporary location onto a new zone; and
   storing the pointers in a new directory pointer block of the optical memory disc.

8. The method as claimed in claim 7, wherein the measuring step utilizes the equation $$\emptyset < Q \leq M/2,$$

where
   Q=an arbitrary quantity representing the unoccupied portion of the zone,
   M=the number of entries in a directory block.

9. The method as claimed in claim 4 or 5, wherein each of the zones has a defined amount of space with each directory block occupying greater than one half of the defined amount, the method further comprising the steps of
   measuring the size of the remaining unoccupied portion of the defined amount of the zone to determine the feasibility of writing one of the two new directory blocks in the zone;
   writing each of the two new directory blocks from the temporary location onto each respective new zone; and
   storing the pointers in a new directory pointer block of the optical memory disc.

10. The method as claimed in claim 9, wherein the measuring step utilizes the equation $$\emptyset < Q \leq M/2,$$

where
   Q=an arbitrary quantity representing the unoccupied portion of the zone,
   M=the number of entries in a directory block.

11. Apparatus for updating an optical memory disc, the disc being of the type that has a plurality of zones, one of the zones containing at least one directory block that includes a plurality of entries in the form of addresses which at data, the apparatus comprising means for reading the entries of the one directory block into a temporary location;

means for altering the entries of the one directory block with new directory information;

means for dividing the entries of the one directory block into two new directory blocks, each of the new directory blocks being designated by a separate pointer;

means for writing the two new directory blocks from the temporary location onto the optical memory disc; and means for storing the pointers in a new directory pointer block of the optical memory disc, whereby subsequent addition of new directory information requires the alteration of less than all of the directory blocks.

12. The apparatus as claimed in 11, wherein each of the zones has a defined amount of space with each directory block occupying less than one half of the defined amount, the apparatus further comprises means for measuring the size of the remaining unoccupied portion of the defined amount of the zone to determine the feasibility of writing one of the two new directory blocks in the zone;

means for writing one of the two new directory blocks from the temporary location onto the remaining portion of the zone;

means for writing the other new directory block from the temporary location onto a new zone; and means for storing the pointers in a new directory pointer block of the optical memory disc.

13. The apparatus as claimed in claim 11, wherein each of the zones has a defined amount of space with each directory block occupying greater than one half of the defined amount, the apparatus further comprises means for measuring the size of the remaining unoccupied portion of the defined amount of the zone to determine the feasibility of writing one of the two new directory blocks in the zone;

means for writing each of the two new directory blocks from the temporary location onto each respective new zone; and means for storing the pointers in a new directory pointer block of the optical memory disc.

* * * * *